United States Patent
Su et al.

(10) Patent No.: US 11,223,760 B2
(45) Date of Patent: Jan. 11, 2022

(54) VIDEO PROCESSING METHOD AND DEVICE, SHOOTING SYSTEM, AND COMPUTER-READABLE STORAGE MEDIUM

(71) Applicant: SZ DJI TECHNOLOGY CO., LTD., Shenzhen (CN)

(72) Inventors: Guanliang Su, Shenzhen (CN); Ye Tao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/214,498

(22) Filed: Mar. 26, 2021

(65) Prior Publication Data

US 2021/0235008 A1  Jul. 29, 2021

Related U.S. Application Data

(63) Continuation of application No. PCT/CN2018/108833, filed on Sep. 29, 2018.

(51) Int. Cl.
*H04N 5/232* (2006.01)
*H04N 5/262* (2006.01)

(52) U.S. Cl.
CPC ..... *H04N 5/23216* (2013.01); *H04N 5/23299* (2018.08); *H04N 5/262* (2013.01)

(58) Field of Classification Search
CPC ............... H04N 5/23216; H04N 5/262; H04N 5/23299; H04N 5/232; H04N 21/845; G05D 3/12
USPC ........................................................ 348/239
See application file for complete search history.

(56) References Cited

U.S. PATENT DOCUMENTS

| | | | |
|---|---|---|---|
| 8,553,037 B2 * | 10/2013 | Smith | G06T 13/40 345/473 |
| 10,008,238 B2 * | 6/2018 | Waterston | G11B 27/034 |
| 10,072,789 B2 * | 9/2018 | Pan | F16M 11/18 |
| 10,567,700 B2 * | 2/2020 | Ai | H04N 5/91 |
| 10,970,930 B1 * | 4/2021 | Olsen | H04N 21/4316 |
| 2004/0004665 A1 * | 1/2004 | Kashiwa | G11B 27/034 348/239 |

(Continued)

FOREIGN PATENT DOCUMENTS

| CN | 103093487 A | 5/2013 |
|---|---|---|
| CN | 105530440 A | 4/2016 |

(Continued)

OTHER PUBLICATIONS

The World Intellectual Property Organization (WIPO) International Search Report for PCT/CN2018/108833 dated Jun. 14, 2019 7 pages.

*Primary Examiner* — Pritham D Prabhakher
(74) *Attorney, Agent, or Firm* — Anova Law Group, PLLC

(57) ABSTRACT

A video processing method includes determining a shooting template that includes background music, one or more gimbal movement trajectories, and one or more shooting elements, sending one or more parameters corresponding to the one or more gimbal movement trajectories to a gimbal to control the gimbal to drive a shooting device to shoot according to the one or more gimbal movement trajectories, obtaining information of at least one video segment, and generating a video file based on the at least one video segment.

17 Claims, 6 Drawing Sheets

(56) References Cited

U.S. PATENT DOCUMENTS

| | | | | |
|---|---|---|---|---|
| 2010/0220197 A1* | 9/2010 | Dukellis | ............... | G11B 27/034 348/207.1 |
| 2015/0318020 A1* | 11/2015 | Pribula | ................ | H04N 9/8205 386/227 |
| 2016/0171330 A1* | 6/2016 | Mentese | .................... | G06T 7/20 348/170 |
| 2017/0256288 A1* | 9/2017 | Ai | ........................... | G11B 27/34 |
| 2017/0294210 A1* | 10/2017 | Abramson | .......... | G06K 9/00765 |
| 2018/0073673 A1* | 3/2018 | Pan | ........................... | G05D 3/12 |

FOREIGN PATENT DOCUMENTS

| | | |
|---|---|---|
| CN | 106603970 A | 4/2017 |
| CN | 107208836 A | 9/2017 |
| CN | 107800948 A | 3/2018 |
| CN | 108377334 A | 8/2018 |
| CN | 108476288 A | 8/2018 |
| CN | 108600636 A | 9/2018 |

\* cited by examiner

VIDEO PROCESSING METHOD AND DEVICE, SHOOTING SYSTEM, AND COMPUTER-READABLE STORAGE MEDIUM

CROSS-REFERENCE TO RELATED APPLICATION

This application is a continuation of International Application No. PCT/CN2018/108833, filed on Sep. 29, 2018, the entire content of which is incorporated herein by reference.

TECHNICAL FIELD

The present disclosure relates to the technical field of image processing and, more specifically, to a video processing method and device, a shooting system, and a computer-readable storage medium.

BACKGROUND

Short video refers to suggested video content that is played on various media platforms, and suitable for viewing in mobile and short-term leisure states, and its length ranges from a few seconds to a few minutes. With the continuous popularization of mobile terminals and the acceleration of network access speed, short videos are gradually gaining users' attractions due to the characteristics of their length, speed, and heavy traffic.

In the conventional short video production process, a plurality of short videos are generally shot through the camera of the user's electronic terminal, and the plurality of short videos obtained from the shooting are cached in the electronic terminal. After the shooting is completed, a third-part video editor is used to synthesize and render the plurality of short videos.

However, when the video production method described above is used for shooting short videos, because the lens of the user's electronic terminal is often unable to complete the video shooting of high difficulty lens rotation, such as moving from point A to point B at a fixed speed in movie shooting, the video effect is poor. In addition, the video production method described above can only be used for video editing through a third-party video editor after shooting, but the videos cannot be edited directly after shooting. Therefore, the production of short videos takes a long time and the operation is more cumbersome, which results in a poor experience.

SUMMARY

In accordance with the disclosure, there is provided a video processing method including determining a shooting template that includes background music, one or more gimbal movement trajectories, and one or more shooting elements, sending one or more parameters corresponding to the one or more gimbal movement trajectories to a gimbal to control the gimbal to drive a shooting device to shoot according to the one or more gimbal movement trajectories, obtaining information of at least one video segment, and generating a video file based on the at least one video segment.

DETAILED DESCRIPTION OF THE EMBODIMENTS

In order to make the objectives, technical solutions, and advantages of the present disclosure clearer, the technical solutions in the embodiments of the present disclosure will be described below with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

Unless otherwise defined, all the technical and scientific terms used in the present disclosure have the same or similar meanings as generally understood by one of ordinary skill in the art. As described in the present disclosure, the terms used in the specification of the present disclosure are intended to describe example embodiments, instead of limiting the present disclosure.

To solve the technical problem of not being able to shoot short videos with high difficulty lens rotation by using the camera of the user's electronic terminal to shoot a plurality of short videos, and the technical problem of the extended amount of time it takes to produce short videos, embodiments of the present disclosure provide a video processing method and device, a shooting system, and a computer-readable storage medium.

It should be noted that the video processing method and device, shooting system, and computer-readable storage medium can be used in a variety of video shooting scenarios. For example, it can be applied to the scene where a user's mobile phone is being used to shoot the video, it can be applied to the scene where a camera is being used to shoot the video, and it can also be applied to the scene where an unmanned aerial vehicle (UAV) is being used to shoot the video. That is, for scenes with video shooting characteristics, the video process method provided in the present disclosure can be used. The execution body of the video processing method provided in the present disclosure can be a video processing device, and the video processing device can be implemented by means of hardware and/or software. More specifically, the video processing device can be wired or wirelessly connected to a shooting apparatus. The shooting apparatus may include a gimbal and a shooting device driven by the gimbal. The shooting device may be a user's handheld device, such as a mobile phone, a camera, etc., or a non-handheld device, such as a UAV.

Exemplary embodiments will be described with reference to the accompanying drawings. In the case where there is no conflict between the exemplary embodiments, the features of the following embodiments and examples may be combined with each other.

Figure 1:
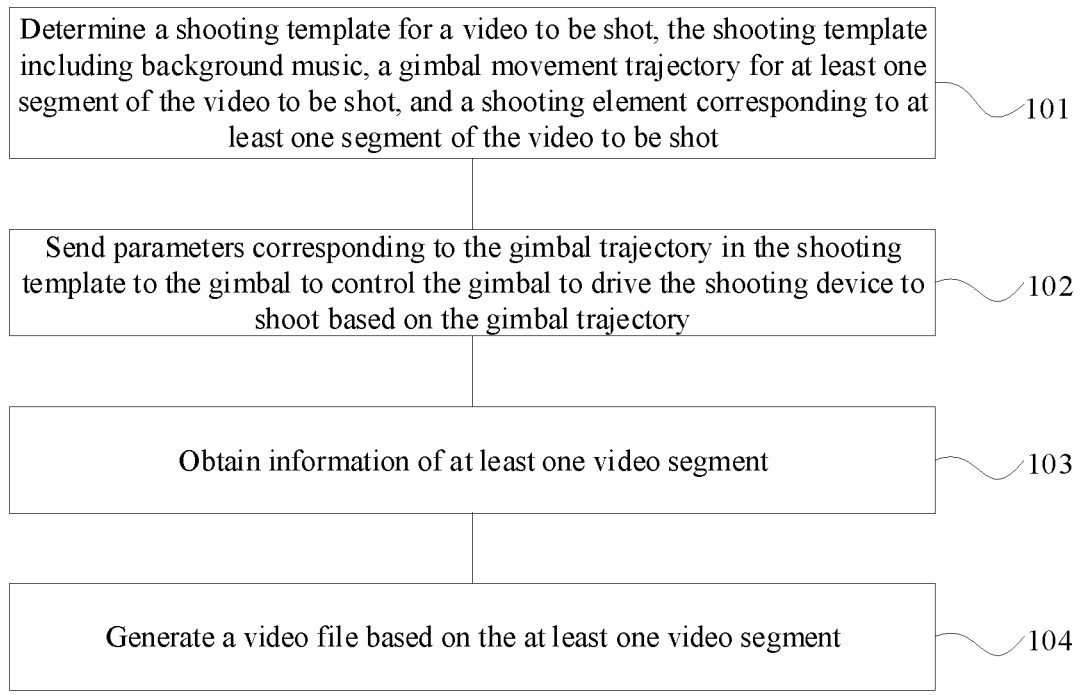
FIG. 1 is a flowchart of a video processing method according to an embodiment of the present disclosure.

FIG. 1 is a flowchart of a video processing method according to an embodiment of the present disclosure. The method will be described in detail below.

101, determining a shooting template for a video to be shot, the shooting template including background music, a gimbal movement trajectory for at least one segment of the video to be shot, and a shooting element corresponding to at least one segment of the video to be shot. The video to be shot is also referred to as a "target video."

In some embodiments, before the video is shot, the shooting template for the video to be shot may need to be determined first. The shooting template may include the background music, the gimbal movement trajectory corresponding to the video to be shot, and the shooting element corresponding to the video to be shot. Since a video file can include one segment of video to be shot or a plurality of segments of video to be shot, the video to be shot can correspond to at least one gimbal movement trajectory and at least one shooting element. More specifically, the background music may be selected by the user from the background music preset by the system, or the background music may be set by the user, which is not limited in the embodiments of the present disclosure. In addition, the gimbal carrying the shooting device may move based on the gimbal movement trajectory in the shooting template, such that the video shot by the shooting device can realize high difficulty video shooting with lens rotation, thereby increasing the quality and richness of the video and improving the user experience. It should be noted that the shooting elements may include, but are not limited to, e.g., filters, stickers, and transitions, and users can set the shooting elements based on the current shooting needs.

102, sending parameters corresponding to the gimbal trajectory (i.e., the gimbal movement trajectory) in the shooting template to the gimbal to control the gimbal to drive the shooting device to shoot according to the gimbal trajectory.

In some embodiments, the video processing device can be connected to a shooting apparatus in a wired or wireless manner. The shooting apparatus may include a gimbal and a shooting device driven by the gimbal. Therefore, in order to enable the gimbal to move according to the gimbal movement trajectory in the shooting template to realize video shooting with high difficulty lens rotation, after the shooting template for the video to be shot is obtained, the parameters corresponding to the gimbal trajectory in the shooting template can be sent to the gimbal, such that the gimbal can be controlled based on the parameters to shoot according to the gimbal trajectory.

103, obtaining information of at least one video segment.

In some embodiments, after the parameters corresponding to the gimbal trajectory in the shooting template is sent to the gimbal, the gimbal can move according to the gimbal movement trajectory, and the shooting device can perform video shooting based on other templates of the shooting template to obtain information of at least one video segment.

104, generating a video file based on the at least one video segment.

In some embodiments, information of at least one video segment can be obtained, and a video file can be generated based on the information of the at least one video segment. More specifically, information of at least one video segment can be edited based on the user's editing instruction to obtain a video file that is more suitable for the user's needs. Further, after the video file is generated based on the at least one video segment, the video file can be processed based on the user's operating instructions. For example, the operating instruction may be a publish instruction sent by user. The publish instruction may include an identification of a platform to publish the video file, and the video file can be published to the platform based on the publish instruction. Alternatively, the operating instruction may be a save instruction sent by the user. The save instruction may include a storage path, and the video file can be saved to the storage path based on the save instruction. Alternatively, the operating instruction may be a forward instruction sent by the user. The forward instruction may include the user identification of the user to forward the video file, and the video file can be forwarded to the electronic terminal corresponding to the user identification based on the forward instruction. In addition, other operations can be performed on the video file based on the user instructions, which are not limited in the embodiments of the present disclosure.

An embodiment of the present disclosure provides a video processing method, which includes determining a shooting template for the video to be shot, the shooting template including background music, a gimbal movement trajectory for at least one segment of the video to be shot, and a shooting element corresponding to at least one segment of the video to be shot; sending parameters corresponding to the gimbal trajectory in the shooting template to the gimbal to control the gimbal to drive the shooting device to shoot according to the gimbal trajectory; obtaining information of at least one video segment; and generating a video file based on the information of the at least one video segment. Therefore, the video processing method can complete the video shooting of difficult lens rotation according to the gimbal movement trajectory. In addition, video shooting based on the shooting template can make the captured video to be more suitable for the user, thereby improving the user experience.

In some embodiments, based on the embodiment described above, the method may further include determining a shooting template for the video to be shot, the shooting template including background music, a gimbal movement trajectory for at least one segment of the video to be shot, and a shooting element corresponding to at least one segment of the video to be shot; sending the parameters corresponding to the gimbal trajectory to the gimbal via a wired connection or a wireless connection; obtaining information of at least one video segment; and generating a video file based on the information of the at least one video segment.

In some embodiments, the video processing device can be connected to the gimbal through wired or wireless connection. Correspondingly, the parameters corresponding to the gimbal trajectory can be sent to the gimbal via a wired connection or a wireless connection. For example, when the gimbal trajectory is sent to the gimbal via a wire, the gimbal can be connected to the user terminal through a wire, such that the user can operation on a display interface of the user terminal and send the parameters corresponding to the gimbal trajectory to the gimbal. When the gimbal trajectory is sent wirelessly to the gimbal, the user terminal can communicate with a remote control of the gimbal, such that the user can operate on the display interface of the user terminal and send control instructions to the remote control of the gimbal, such that the remote control of the gimbal can wirelessly send the control instructions to the gimbal.

An embodiment of the present disclosure provides a video processing method, which can be used to send the parameters corresponding to the trajectory of the gimbal to the gimbal via a wired connection or a wireless connection, thereby achieving effective control of the gimbal, ensuring that the gimbal can move according to the gimbal movement trajectory in the shooting template, such that the captured video is more suitable for the user's needs.

Figure 2:
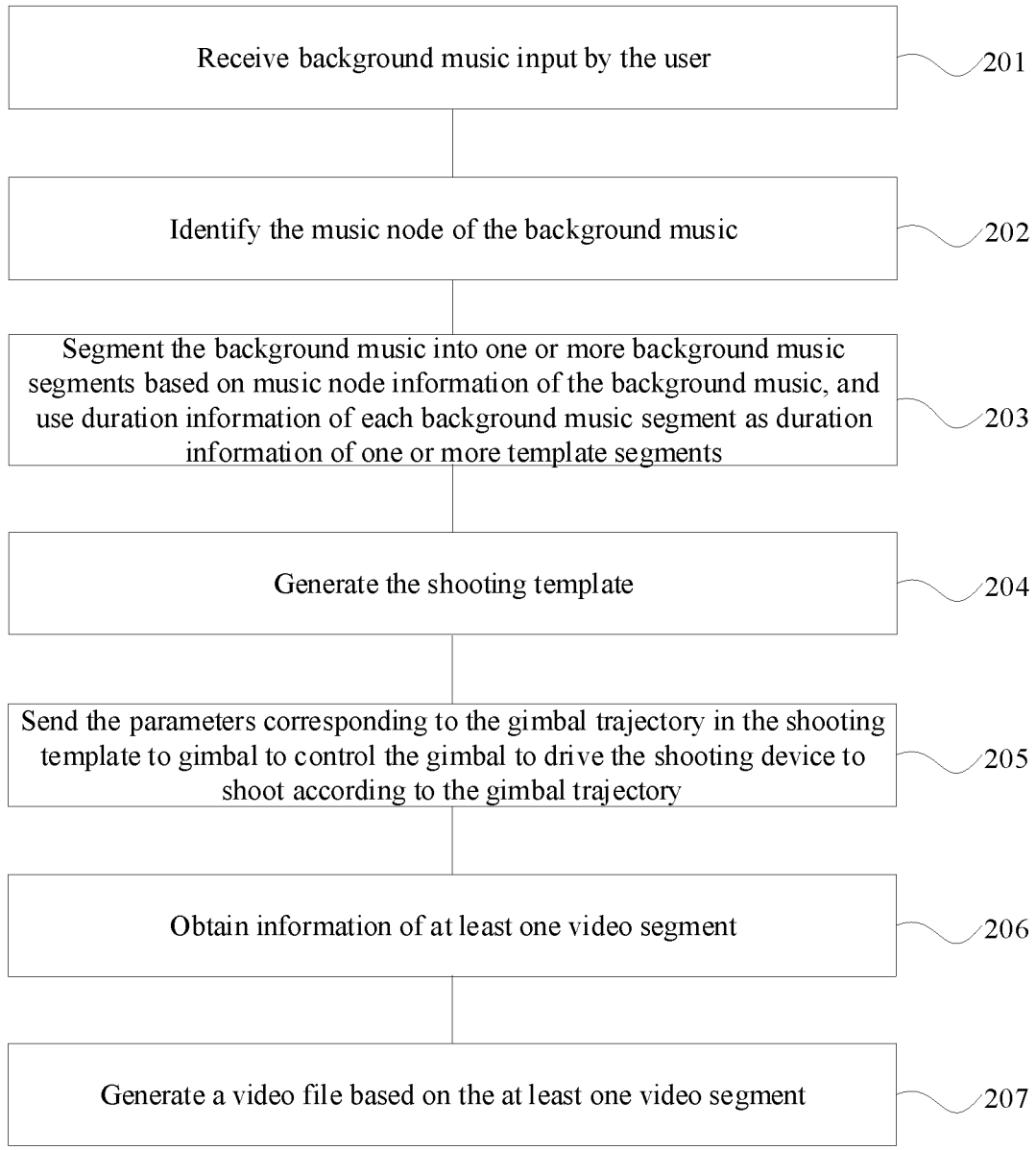
FIG. 2 is a flowchart of a video processing method according to another embodiment of the present disclosure.

FIG. 2 is a flowchart of a video processing method according to another embodiment of the present disclosure. Based on any of the foregoing embodiments, as shown in FIG. 2, the method includes the following processes.

201, receiving background music input by the user.

202, identifying the music node of the background music.

203, segmenting the background music into one or more background music segments based on music node information of the background music, and using duration information of each background music segment as duration information of one or more template segments.

204, generating the shooting template.

205, sending the parameters corresponding to the gimbal trajectory in the shooting template to the gimbal to control the gimbal to drive the shooting device to shoot according to the gimbal trajectory.

206, obtaining information of at least one video segment.

207, generating a video file based on the information of the at least one video segment.

In some embodiments, the background music input by the user can be segmented to obtain a plurality of background music segments. More specifically, the background music may be input by the user, or the background music may be selected by the user from the background music preset by the system or set by the user, which is not limited in the embodiments of the present disclosure. The music node in the background music can be identified, and the background music can be segmented into one or more background music segments based on the music node. For each background music segment, the duration of the segment can be used as the shooting duration information in the template segment. The shooting template can be generated based on the segmented background music and the duration information of one or more template segments, such that the video to be shot captured based on the shooting template can be based on the rhythm of the music node, making the video to be shot more rhythmic. It should be noted that the shooting template may only include background music information, and other gimbal movement trajectories and shooting element information may be the system default, such as only rotating around the yaw axis. In some embodiments, other elements in the shooting template may be added after the background music is segmented, which is not limited in the embodiments of the present disclosure. Correspondingly, after the shooting template is determined, the parameters corresponding to the gimbal trajectory in the shooting template can be sent to the gimbal to control the gimbal to drive the shooting device to shoot according to the gimbal trajectory, information of at least one video segment can be obtained, and a video file can be generated based on the at least one video segment.

An embodiment of the present disclosure provides a video processing method, which can be used to identify the music node in the background music input by the user, and segment the background music into one or more background music segments based on the music node. For each background music segment, the duration of the segment can be used as the shooting duration information in the template segment, such that subsequent videos to be shot based on the shooting template can be based on the rhythm of the music node, making the video to be shot more rhythmic, thereby improving the user experience.

In some embodiments, based on any of the foregoing embodiments, the method may further include receiving background music input by the user; identifying the music node of the background music; segmenting the background music into one or more background music segments based on information of the music node of the background music, and using duration information of each background music segment as the duration information of one or more template segment; determining the gimbal movement trajectory corresponding to the template segment for each background music segment; generating the shooting template; sending the parameters corresponding to the gimbal trajectory in the shooting template to the gimbal to control the gimbal to drive the shooting device to shoot according to the gimbal trajectory; obtaining information of at least one video segment; and generating a video file based on the information of the at least one video segment.

In this embodiment, the music node in the background music input by the user can be identified, and the background music can be segmented into one or more background music segments based on the music node. For each background music segment, after the duration of the segment is used as the shooting duration information in the template segment, a corresponding gimbal movement trajectory can be set for each background music segment. More specifically, for each background music segment, the gimbal movement trajectory corresponding to the template segment can be determined. In some embodiments, the gimbal movement trajectory can be set by the user, or it can be the default system gimbal movement trajectory, which is not limited in the embodiments of the present disclosure.

The video processing method provided in this embodiment can be used to determine the gimbal movement trajectory to be set corresponding to the template segment for each background music segment, such that the video to be shot can be shot based on the rhythm of the music node, making the video to be shot more rhythmic.

In some embodiments, based on any of the foregoing embodiments, the method may further include receiving background music input by the user; identifying the music node of the background music; segmenting the background music into one or more background music segments based on information of the music node of the background music, and using duration information of each background music segment as the duration information of one or more template segment; determining the gimbal movement trajectory corresponding to the template segment based on the duration information of each of the template segment; generating the shooting template; sending the parameters corresponding to the gimbal trajectory in the shooting template to the gimbal to control the gimbal to drive the shooting device to shoot according to the gimbal trajectory; obtaining information of at least one video segment; and generating a video file based on the information of the at least one video segment.

In this embodiment, the music node in the background music input by the user can be identified, and the background music can be segmented into one or more background music segments based on the music node. For each background music segment, after the duration of the segment is used as the shooting duration information in the template segment, a corresponding gimbal movement trajectory can be set for each background music segment. More specifically, for each background music segment, the gimbal movement trajectory corresponding to the template segment can be determined based on the duration information of each template segment. For example, if a background music is segmented into four background music segments of 3.1 s, 4.2 s, 3.6 s, and 4.5 s, then correspondingly, the duration information of various template segments may also be 3.1 s, 4.2 s, 3.6 s, and 4.5 s. Further, for the template segment with a duration of 3.1 s, a gimbal movement trajectory of 3.1 s can be arranged; for the template segment with a duration of 4.2 s, a gimbal movement trajectory of 4.2 s can be arranged; for the template segment with a duration of 3.6 s, a gimbal movement trajectory of 3.6 s can be arranged; and for the template segment with a duration of 4.5 s, a gimbal movement trajectory of 4.5 s can be arranged.

The video processing method provided in this embodiment can be used to determine the gimbal movement trajectory corresponding to the template segment based on the duration information of each template segment. In this way, the gimbal movement trajectory can be more closely aligned with the template segment, and the effect of the video to be shot based on the template can be better.

In some embodiments, based on any of the foregoing embodiments, the method may further include receiving background music input by the user; identifying the music node of the background music; segmenting the background music into one or more background music segments based on information of the music node of the background music, and using duration information of each background music segment as the duration information of one or more template segments; obtaining one or more gimbal movement trajectories whose movement durations are consistent with the duration information corresponding to the template segments based on the duration information of each of the template segments; obtaining score information of the gimbal movement trajectory whose movement duration is consistent with the duration information corresponding to the template segment, the scoring information may be information published by users who have used it based on their experience; taking the gimbal movement trajectory with the highest score information as the gimbal movement trajectory corresponding to the template segment; generating the shooting template; sending the parameters corresponding to the gimbal trajectory in the shooting template to the gimbal to control the gimbal to drive the shooting device to shoot according to the gimbal trajectory; obtaining information of at least one video segment; and generating a video file based on the information of the at least one video segment.

In this embodiment, the music node in the background music input by the user can be identified, and the background music can be segmented into one or more background music segments based on the music node. For each background music segment, after the duration of the segment is used as the shooting duration information in the template segment, a corresponding gimbal movement trajectory can be set for each background music segment. It can be understood that since the duration of the background music segment may correspond to a plurality of different gimbal movement trajectories, the gimbal movement trajectory can be determined based on the score information of each movement trajectory. More specifically, based on the duration information of each template segment, one or more gimbal movement trajectories whose movement durations are consistent with the duration information corresponding to the template segments can be obtained, and the score information of each gimbal movement trajectory can be obtained. The score information may be published by users who have used the gimbal movement trajectory based on their historical experience. The gimbal movement trajectory with the highest score can be taken as the gimbal movement trajectory to the shot, thereby determining the template to be shot.

The video processing method provided in this embodiment can be used to obtain one or more gimbal movement trajectories whose movement durations are consistent with the duration information corresponding to the template segments based on the duration information of each of the template segments; obtain score information of the gimbal movement trajectory whose movement duration is consistent with the duration information corresponding to the template segment, the scoring information may be information published by users who have used it based on their experience; and take the gimbal movement trajectory with the highest score information as the gimbal movement trajectory corresponding to the template segment. In this way, the obtained shooting template can better meet the needs of the user and improve the user experience.

In some embodiments, based on any of the foregoing embodiments, the method may further include receiving background music input by the user; identifying the music node of the background music; segmenting the background music into one or more background music segments based on information of the music node of the background music, and using duration information of each background music segment as the duration information of one or more template segments; obtaining one or more gimbal movement trajectories whose movement durations are consistent with the duration information corresponding to the template segments based on the duration information of each of the template segments; pushing the one or more gimbal movement trajectories whose movement durations are consistent with the duration information corresponding to the template segments to the user; receiving a second selection instruction from the user, the second selection instruction including the identification of the gimbal movement trajectory; determining the gimbal movement trajectory corresponding to the template segment based on the second selection instruction; generating the shooting template; sending the parameters corresponding to the gimbal trajectory in the shooting template to the gimbal to control the gimbal to drive the shooting device to shoot according to the gimbal trajectory; obtaining information of at least one video segment; and generating a video file based on the information of the at least one video segment.

In this embodiment, the music node in the background music input by the user can be identified, and the background music can be segmented into one or more background music segments based on the music node. For each background music segment, after the duration of the segment is used as the shooting duration information in the template segment, a corresponding gimbal movement trajectory can be set for each background music segment. It can be understood that since the duration of the background music segment may correspond to a plurality of different gimbal movement trajectories, the gimbal movement trajectory can be determined based on the user's selection. More specifically, one or more gimbal movement trajectories whose movement durations are consistent with the duration information corresponding to the template segments based on the duration information of each of the template segments can be obtained, and the one or more gimbal movement trajectories whose movement durations are consistent with the duration information corresponding to the template segments can be pushed to the user. Subsequently, a second selection instruction from the user can be received, and the second selection instruction may include the identification of the gimbal movement trajectory, and the gimbal movement trajectory corresponding to the template segment can be determined based on the second selection instruction.

The video processing method provided in this embodiment can be used to obtain one or more gimbal movement trajectories whose movement durations are consistent with the duration information corresponding to the template segments based on the duration information of each of the template segments; push the one or more gimbal movement trajectories whose movement durations are consistent with the duration information corresponding to the template segments to the user; receive a second selection instruction from the user, the second selection instruction including the identification of the gimbal movement trajectory; and determine the gimbal movement trajectory corresponding to the template segment based on the second selection instruction; generating the shooting template. In this way, the obtained shooting template can better meet the needs of the user and improve the user experience.

It should be noted that the embodiments described above can be implemented separately or in combination. For the separate implementation, reference can be made to the descriptions of the previous embodiments. For the combined implementation, one or more gimbal movement trajectories whose movement durations are consistent with the duration information corresponding to the template segments based on the duration information of each of the template segments can be obtained, and the score information of each gimbal movement trajectory can be obtained. In some embodiments, the score information may be published based on historical experience by users who have used the gimbal movement trajectories. Both the score information of each gimbal movement trajectory and the movement trajectories can be displayed to the user, and the user can determine the trajectory of the gimbal to be shot based on the gimbal movement trajectory and its score.

In some embodiments, based on any of the foregoing embodiments, the method may further include receiving background music input by the user; identifying the music node of the background music; segmenting the background music into one or more background music segments based on information of the music node of the background music, and using duration information of each background music segment as the duration information of one or more template segments; determining the gimbal movement trajectory that conforms to a rhythm style based on the rhythm of each segment of the background music; generating the shooting template; sending the parameters corresponding to the gimbal trajectory in the shooting template to the gimbal to control the gimbal to drive the shooting device to shoot according to the gimbal trajectory; obtaining information of at least one video segment; and generating a video file based on the information of the at least one video segment.

In this embodiment, after the background music input by the user is received, the music node of the background music is identified, the background music is segmented into one or more background music segments based on the music node information of the background music, and the duration information of each of the background music segments is taken as the duration information of one or more template segments, the gimbal movement trajectory can be set based on the rhythm of the background music segment. More specifically, since the background music may have a variety of different rhythms, such as dynamic, soft, classical, etc., different background music segments may need to use different gimbal movement trajectories to match the rhythm to further improve the shooting effect. Therefore, based on the rhythm of each background music segment, a gimbal movement trajectory that is in line with the rhythm style can be determined. For example, if the rhythm of the music is relatively smooth, a gimbal movement trajectory with a slower moving speed that can match the rhythm may be set.

The video processing method provided in this embodiment can be used to further improving the shooting effect by determining the gimbal movement trajectory based on the rhythm of each background music segment.

In some embodiments, based on any of the foregoing embodiments, the method may further include receiving background music input by the user; identifying the music node of the background music; segmenting the background music into one or more background music segments based on information of the music node of the background music, and using duration information of each background music segment as the duration information of one or more template segments; determining the shooting element corresponding to each template segment based on a user's first selection instruction; generating the shooting template; sending the parameters corresponding to the gimbal trajectory in the shooting template to the gimbal to control the gimbal to drive the shooting device to shoot according to the gimbal trajectory; obtaining information of at least one video segment; and generating a video file based on the information of the at least one video segment.

In this embodiment, after background music input by the user is received, the music node of the background music is identified, the background music is segmented into one or more background music segments based on information of the music node of the background music, and duration information of each background music segment is used as the duration information of one or more template segments, a shooting element can be set for each template segment. More specifically, a user's first selection instruction can be received, and the first selection instruction may include the identification of the shooting element, such that the shooting element may be determined based on the first selection instruction. It should be noted that the shooting element may include, but is not limited to, a filter, a sticker, and/or a transition, which can be set by the user based on the current shooting needs.

The video processing method provided in this embodiment can be used to determine the shooting element corresponding to each template segment based on the user's first selection instruction, such that the video shot based on the shooting template can better meet the needs of the user and improve the user experience.

In some embodiments, based on any of the foregoing embodiments, the method may further include receiving background music input by the user; identifying the music node of the background music; segmenting the background music into one or more background music segments based on the music node information in the background music by using a preset segmentation algorithm; determining the shooting element corresponding to each template segment based on the user's first selection instruction; generating the shooting template; sending the parameters corresponding to the gimbal trajectory in the shooting template to the gimbal to control the gimbal to drive the shooting device to shoot according to the gimbal trajectory; obtaining information of at least one video segment; and generating a video file based on the information of the at least one video segment.

There are many ways to segment the background music. In some embodiments, the background music can be segmented into one or more background music segments based on the music node information in the background music by using a preset segmentation algorithm.

The video processing method provided in this embodiment can be used to segment the background music into one or more background music segments based on the music node information in the background music by using a preset segmentation algorithm, such that the background music can be segmented quickly, thereby improving the efficiency of generating a shooting template.

Figure 3:
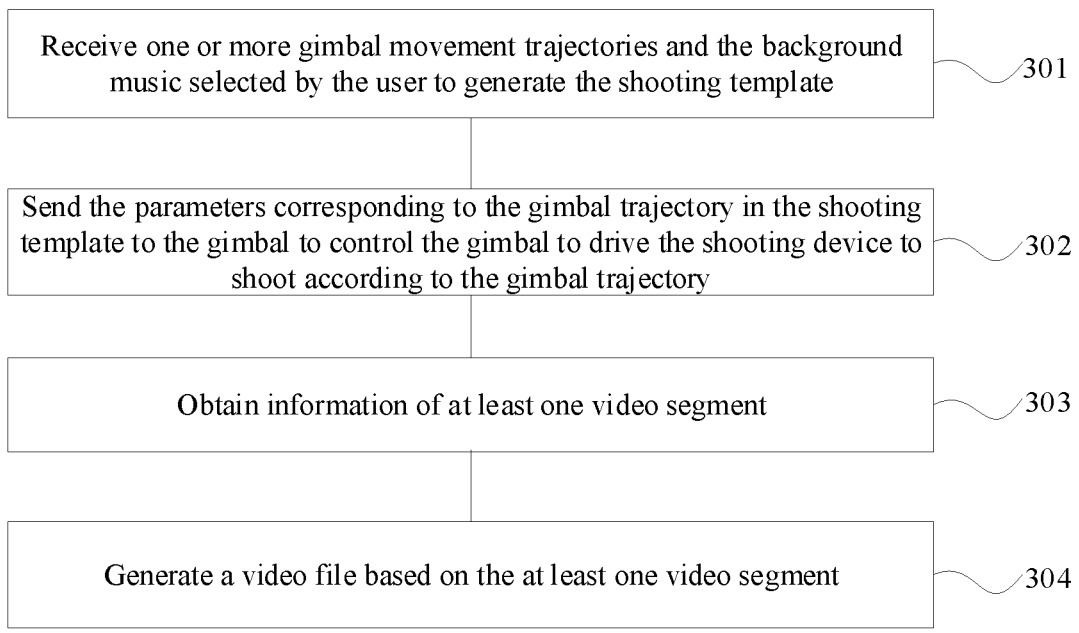
FIG. 3 is a flowchart of a video processing method according to another embodiment of the present disclosure.

FIG. 3 is a flowchart of a video processing method according to another embodiment of the present disclosure. Based on any of the foregoing embodiments, as shown in FIG. 3, the method includes the following processes.

301, receiving one or more gimbal movement trajectories and the background music selected by the user to generate the shooting template.

302, sending the parameters corresponding to the gimbal trajectory in the shooting template to the gimbal to control the gimbal to drive the shooting device to shoot according to the gimbal trajectory.

303, obtaining information of at least one video segment.

304, generating a video file based on the information of the at least one video segment.

In this embodiment, in addition to setting the shooting template based on the background music, the shooting template can also be set based on the background music and the gimbal movement trajectory. More specifically, the background music input by the user and the one or more gimbal movement trajectories can be received, where the background music may be one of a plurality of background music pre-stored in the system, which can be determined based on the user's selection instruction, or it can be user-defined background music, which is not limited in the embodiments of the present disclosure. In addition, the gimbal movement trajectory may be one of the plurality of default system movement trajectories, such as yaw, pitch, roll, etc., or it may be a user-defined trajectory randomly combined by yaw, pitch, and roll, which is not limited in the embodiments of the present disclosure.

The video processing method provided in this embodiment can be used to generate the shooting template by receiving the one or more gimbal movement trajectories and the background music selected by the user, such that the shooting template can be more tailored to the needs of the user, thereby improving the shooting effect and the user experience.

In some embodiments, based on any of the foregoing embodiments, the method may further include receiving the one or more gimbal movement trajectories and the background music selected by the user to generate the shooting template; segmenting the background music into one or more background music segments based on the music node information, and using the duration information of each background music segment as the duration information of one or more template segments; adjusting each gimbal movement trajectory such that the duration of each gimbal movement trajectory matches the duration of each background music segment; sending the parameters corresponding to the gimbal trajectory in the shooting template to the gimbal to control the gimbal to drive the shooting device to shoot according to the gimbal trajectory; obtaining information of at least one video segment; and generating a video file based on the information of the at least one video segment.

In this embodiment, after the one or more gimbal movement trajectories and the background music selected by the user are received to generate the shooting template, the background music can be segmented into one or more background music segments based on the music node information in the background music, and the duration information of the one or more template segments can be determined based on the duration information of the background music segment. It should be noted that since the duration information of the background music segment segmented based on the music node may not match the movement time of the gimbal movement trajectory selected by the user, the gimbal movement trajectory or the background music segment may be adjusted. It can be understood that compressing and stretching the background music segment can cause poor shooting effect. Therefore, in order to improve the video shooting effect, the gimbal movement trajectory can be adjusted based on the duration information of the background music segment, such that the duration of each gimbal movement trajectory can match the duration of each background music segment.

The video processing method provided in this embodiment can be used to segment the background music into one or more background music segments based on the music node information, use the duration information of each background music segment as the duration information of one or more template segments, and adjust each gimbal movement trajectory such that the duration of each gimbal movement trajectory matches the duration of each background music segment, thereby ensuring that the shooting effect and making the shooting template more suitable to the user.

In some embodiments, based on any of the foregoing embodiments, the method may further include receiving the one or more gimbal movement trajectories and the background music selected by the user to generate the shooting template; segmenting the background music into one or more background music segments based on the music node information, and using the duration information of each background music segment as the duration information of one or more template segments; adjusting the movement speed of the gimbal based on the duration information corresponding to the template segment, such that the duration of the completion of the gimbal movement trajectory may be consistent with the duration information corresponding to the template segment; sending the parameters corresponding to the gimbal trajectory in the shooting template to the gimbal to control the gimbal to drive the shooting device to shoot according to the gimbal trajectory; obtaining information of at least one video segment; and generating a video file based on the information of the at least one video segment.

In this embodiment, the gimbal movement trajectory can be matched with the template segment by adjusting the movement speed of the gimbal. More specifically, the movement speed of the gimbal can be adjusted based on the duration information corresponding to the template segment, such that the completion time of the gimbal movement trajectory can be consistent with the time corresponding to the template segment. For example, if the duration of the current background music segment is 3.7 s, and the time for the completion of the gimbal background music is 3.5 s, the movement speed of the gimbal can be reduced to extend the completion time of the gimbal movement trajectory from 3.5 s to 3.7 s, which can match with the background music segment.

The video processing method provided in this embodiment can be used to adjust the movement speed of the gimbal based on the duration information corresponding to the template segment, such that the duration of the completion of the gimbal movement trajectory is consistent with the duration information corresponding to the template segment, thereby ensuring that the shooting effect and making the shooting template more suitable to the user.

In some embodiments, based on any of the foregoing embodiments, the method may further include receiving the one or more gimbal movement trajectories and the background music selected by the user to generate the shooting template; determining the shooting element based on the user's first selection instruction and obtaining the shooting template; segmenting the background music into one or more background music segments based on the music node information, and using the duration information of each background music segment as the duration information of one or more template segments; adjusting each gimbal movement trajectory such that the duration of each gimbal movement trajectory matches the duration of each background music segment; sending the parameters corresponding to the gimbal trajectory in the shooting template to the gimbal to control the gimbal to drive the shooting device to shoot according to the gimbal trajectory; obtaining information of at least one video segment; and generating a video file based on the information of the at least one video segment.

In this embodiment, after the one or more gimbal movement trajectories and the background music selected by the user are received, the first selection instruction input by the user can also be received. In some embodiments, the first selection instruction may include the identification of the shooting element, such that the shooting element can be determined based on the first selection instruction. It should be noted that the shooting element may include, but is not limited to, a filter, a sticker, and/or a transition, which can be set by the user based on the current shooting needs.

In the video processing method provided in this embodiment, the shooting element can be determined based on the user's first selection instruction, and the shooting template can be obtained, such that on the basis of increasing the richness of video shooting, the captured video is more suitable for the user's needs.

Figure 4:
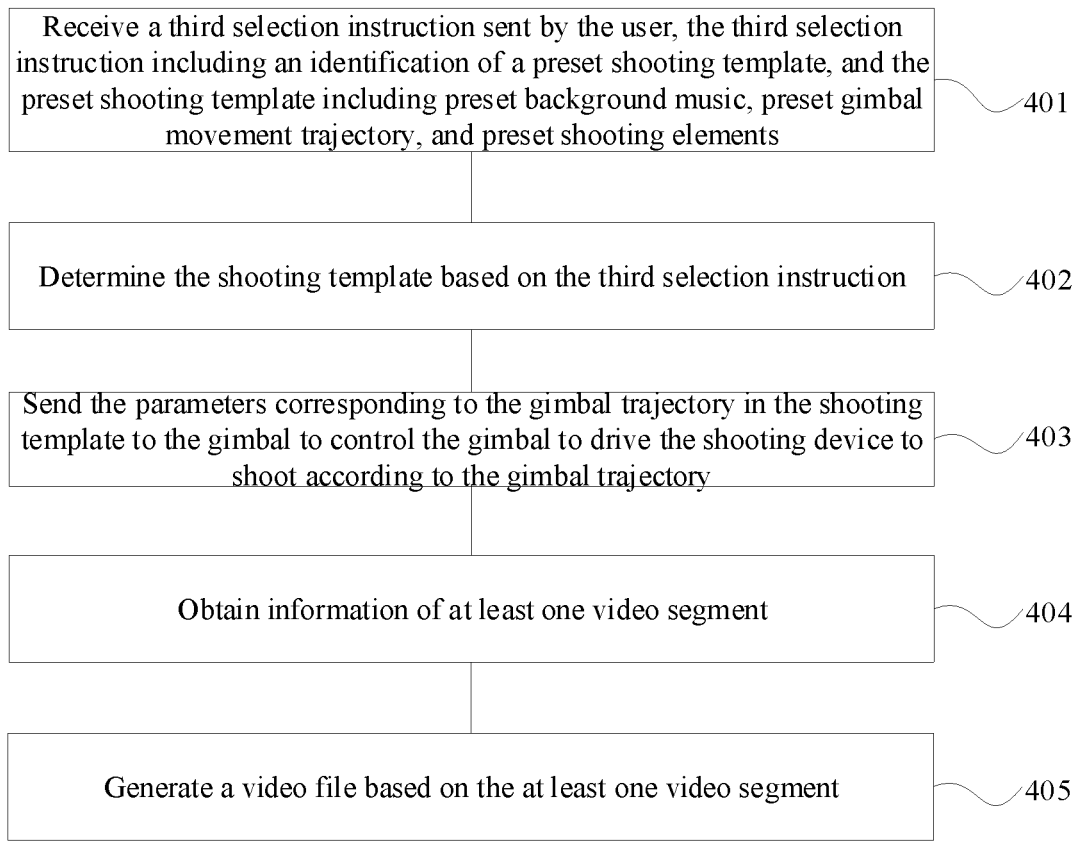
FIG. 4 is a flowchart of a video processing method according to another embodiment of the present disclosure.

FIG. 4 is a flowchart of a video processing method according to another embodiment of the present disclosure. Based on any of the foregoing embodiments, as shown in FIG. 4, the method includes the following processes.

401, receiving a third selection instruction sent by the user, the third selection instruction including an identification of a preset shooting template, and the preset shooting template including preset background music, preset gimbal movement trajectory, and preset shooting elements.

402, determining the shooting template based on the third selection instruction.

403, sending the parameters corresponding to the gimbal trajectory in the shooting template to the gimbal to control the gimbal to drive the shooting device to shoot according to the gimbal trajectory.

404, obtaining information of at least one video segment.

405, generating a video file based on the information of the at least one video segment.

In this embodiment, a plurality of different types of preset shooting templates can be set in advance. The preset shooting template may include background music, gimbal movement trajectory, and shooting element. Users only need to select the preset shooting template to shoot a video based on the shooting template. Different preset shooting template may have different preset shooting modes. For example, in the shooting template of the dynamic mode, the background music and the gimbal movement trajectory may be more active. More specifically, a third selection instruction from the user may be received, and the third selection instruction may include the identification of the preset shooting template. Therefore, the preset shooting template can be determined based on the third selection instruction, and the preset shooting template can be used as the current shooting template. It should be noted that since various shooting elements in the preset shooting template have been set in advance, users can directly shoot videos based on the preset shooting template without customization or adjustment, which provides a better user experience.

In the video processing method provided in this embodiment, a third selection instruction sent by a user can be received, and the shooting template can be determined based on the third selection instruction. The third selection instruction may include an identification of a preset shooting template, and the preset shooting template may include the preset background music, preset gimbal movement trajectory, and preset shooting elements. In this way, the user experience can be improved on the basis of achieving high difficulty lens rotation video shooting.

Figure 5:
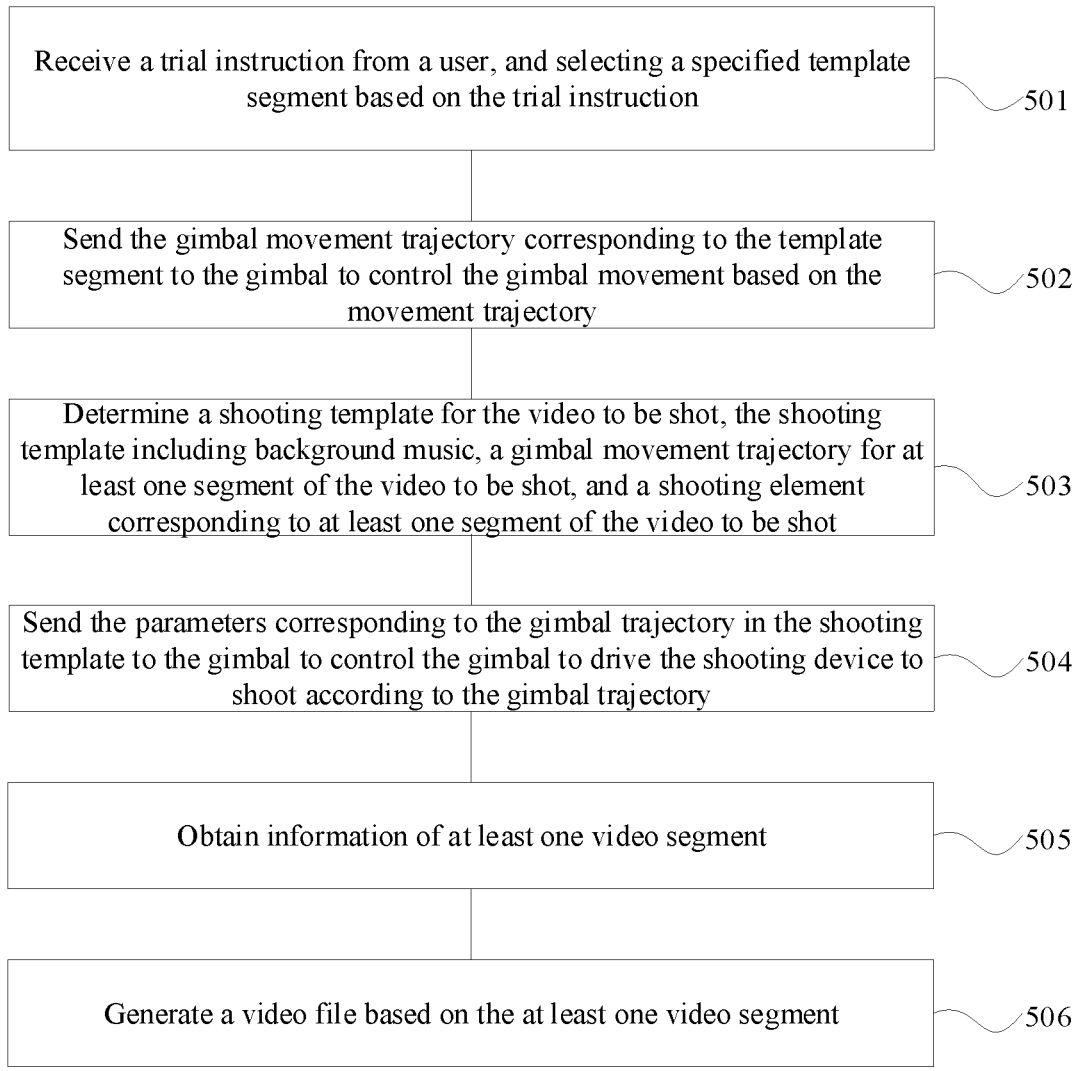
FIG. 5 is a flowchart of a video processing method according to another embodiment of the present disclosure.

FIG. 5 is a flowchart of a video processing method according to another embodiment of the present disclosure. Based on any of the foregoing embodiments, as shown in FIG. 5, the method includes the following processes.

501, receiving a trial instruction from a user, and selecting a specified template segment based on the trial instruction.

502, sending the gimbal movement trajectory corresponding to the template segment to the gimbal to control the gimbal movement based on the movement trajectory.

503, determining a shooting template for the video to be shot, the shooting template including background music, a gimbal movement trajectory for at least one segment of the video to be shot, and a shooting element corresponding to at least one segment of the video to be shot.

504, sending the parameters corresponding to the gimbal trajectory in the shooting template to the gimbal to control the gimbal to drive the shooting device to shoot according to the gimbal trajectory.

505, obtaining information of at least one video segment.

506, generating a video file based on the information of the at least one video segment.

In this embodiment, after the shooting template is determined, if video shooting is performed directly based on the shooting template, the captured video may not meet the needs of the user, and it may be cumbersome and inefficient to adjustment after the video shooting is completed. Therefore, in order to make the captured video more suitable for the user's needs, before the user determines the shooting template and prepares to shoot based on the shooting template, a user's trial instruction can be received. In some embodiments, the trial instruction may include an identification of the template segment. In this way, the specified template segment can be selected based on the trial instruction, and the gimbal movement trajectory corresponding to the template segment can be sent to the gimbal to control the gimbal movement based on the movement trajectory. As such, the user can adjust the current shooting template based on the effect of the trial, and the video captured based on the adjusted shooting template can better meet the needs of the user.

In the video processing method provided in this embodiment, by receiving a trial instruction from a user, selecting a specified template segment based on the trial instruction, and sending the gimbal movement trajectory corresponding to the template segment to the gimbal to control the gimbal movement based on the movement trajectory, the captured video can better meet the needs of the user.

In some embodiments, based on any of the foregoing embodiments, the method may further include receiving a trial instruction from the user, the trial instruction including background music and/or gimbal movement trajectory and/or identification of the shooting element; displaying the shooting effect corresponding to the background music and/or the shooting element to the user based on the trial instruction such that the user can select the background music and/or the shooting element based on the shooting effect to determine the shooting template for the video to be shot; determining a shooting template for the video to be shot, the shooting template including background music, a gimbal movement trajectory for at least one segment of the video to be shot, and a shooting element corresponding to at least one segment of the video to be shot; sending the parameters corresponding to the gimbal trajectory in the shooting template to the gimbal to control the gimbal to drive the shooting device to shoot according to the gimbal trajectory; obtaining information of at least one video segment; and generating a video file based on the information of the at least one video segment.

In some embodiments, before the user selects the background music and/or the gimbal movement trajectory and/or the identification of the shooting element in the shooting template, the user may try the shooting template and make the selection based on the trial result. More specifically, a trial instruction from the user can be received. The trial instruction may include the background music and/or the trial movement trajectory and/or the identification of the shooting element. Based on the trial instruction, the background music and/or the shooting element corresponding to the shooting element can be displayed to the user, such that the user can select the background music and/or shooting element based on the shooting effect to determine the shooting template for the video to be shot.

In the video processing method provided in this embodiment, a trial instruction from a user can be received, the trial instruction may include the background music and/or gimbal movement trajectory and/or the identification of the shooting element. Based on the trial instruction, the background music and/or the shooting element corresponding to the shooting element can be displayed to the user, such that the user can select the background music and/or shooting element based on the shooting effect to determine the shooting template for the video to be shot. In this way, the captured video can be more suitable for the user's needs.

Figure 6:
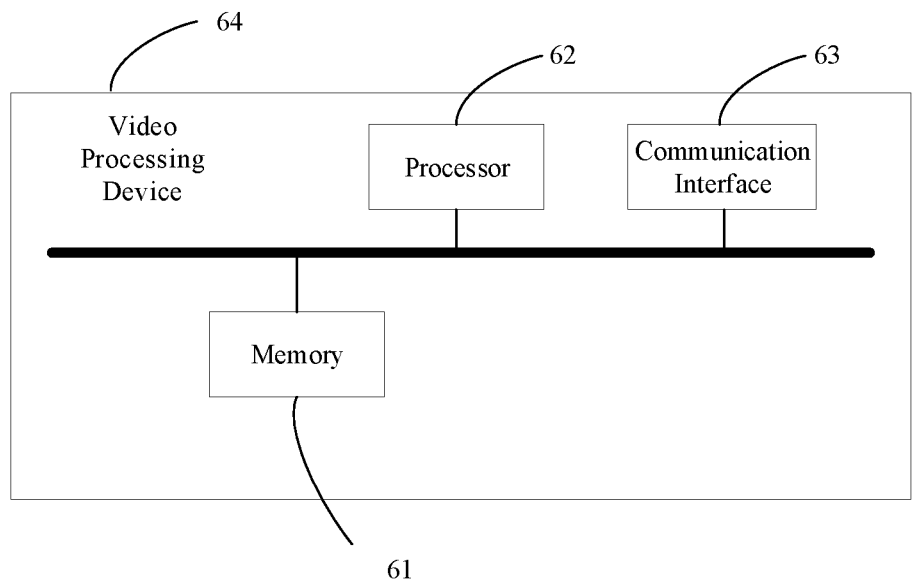
FIG. 6 is a schematic structural diagram of a video processing device according to an embodiment of the present disclosure.

FIG. 6 is a schematic structural diagram of a video processing device 64 according to an embodiment of the present disclosure. As shown in FIG. 6, the video processing device 64 includes a memory 61 configured to store program instructions, a processor 62 configured to execute the program instructions stored in the memory 61, and a communication interface 63.

When executed by the processor 62, the program instructions can cause the processor 62 to determine a shooting template for the video to be shot, the shooting template including background music, a gimbal movement trajectory for at least one segment of the video to be shot, and a shooting element corresponding to at least one segment of the video to be shot; send the parameters corresponding to the gimbal trajectory in the shooting template to the gimbal to control the gimbal to drive the shooting device to shoot according to the gimbal trajectory; obtain information of at least one video segment; and generate a video file based on the information of the at least one video segment.

An embodiment of the present disclosure provides a video processing method, which includes determining a shooting template for the video to be shot, the shooting template including background music, a gimbal movement trajectory for at least one segment of the video to be shot, and a shooting element corresponding to at least one segment of the video to be shot; sending the parameters corresponding to the gimbal trajectory in the shooting template to the gimbal to control the gimbal to drive the shooting device to shoot according to the gimbal trajectory; obtaining information of at least one video segment; and generating a video file based on the information of the at least one video segment. Therefore, the video processing method can complete the video shooting of difficult lens rotation according to the gimbal movement trajectory. In addition, video shooting based on the shooting template can make the captured video to be more suitable for the user, thereby improving the user experience.

In some embodiments, when determining the shooting template for the video to be shot, the processor 62 may be configured to receive background music input by the user; identify the music node of the background music; segment the background music into one or more background music segments based on information of the music node of the background music, and use duration information of each background music segment as the duration information of one or more template segments; and generate the shooting template.

In some embodiments, after segmenting the background music into one or more background music segments based on information of the music node of the background music, and using duration information of each background music segment as the duration information of one or more template segments, the processor 62 may be configured to determine the gimbal movement trajectory corresponding to the template segment for each background music segment.

In some embodiments, when determining the gimbal movement trajectory corresponding to each of the background music segments, the processor 62 may be configured to determine the gimbal movement trajectory corresponding to the template segment based on the duration information of each of the template segments.

In some embodiments, when determining the gimbal movement trajectory corresponding to the template segment based on the duration information of each of the template segments, the processor 62 may be configured to obtain one or more gimbal movement trajectories whose movement durations are consistent with the duration information corresponding to the template segments based on the duration information of each of the template segments; obtain score information of the gimbal movement trajectory whose movement duration is consistent with the duration information corresponding to the template segment, the scoring information may be information published by users who have used it based on their experience; and take the gimbal movement trajectory with the highest score information as the gimbal movement trajectory corresponding to the template segment.

In some embodiments, when determining the gimbal movement trajectory corresponding to the template segment based on the duration information of each of the template segments, the processor 62 may be configured to obtain one or more gimbal movement trajectories whose movement durations are consistent with the duration information corresponding to the template segments based on the duration information of each of the template segments; push the one or more gimbal movement trajectories whose movement durations are consistent with the duration information corresponding to the template segments to the user; receive a second selection instruction from the user, the second selection instruction including the identification of the gimbal movement trajectory; and determine the gimbal movement trajectory corresponding to the template segment based on the second selection instruction.

In some embodiments, when determining the gimbal movement trajectory corresponding to the template segment of each of the background music segment, the processor 62 may be configured to determine the gimbal movement trajectory at conforms to the rhythm style based on the rhythm of each background music segment.

In some embodiments, after segmenting the background music into one or more background music segments based on information of the music node of the background music, and using duration information of each background music segment as the duration information of one or more template segments, the processor 62 may be configured to determine the shooting element corresponding to each template segment based on the user's first selection instruction.

In some embodiments, when segmenting the background music based on the music node information in the background music, the processor 62 may be configured to segment the background music into one or more background music segments based on the music node information in the background music by using a preset segmentation algorithm.

In some embodiments, when determining the shooting template for the video to be shot, the processor 62 may be configured to receive the one or more gimbal movement trajectories and the background music selected by the user to generate the shooting template.

In some embodiments, the processor 62 may be further configured to segment the background music into one or more background music segments based on the music node information and use the duration information of each background music segment as the duration information of one or more template segments, and adjust each gimbal movement trajectory such that the duration of each gimbal movement trajectory matches the duration of each background music segment.

In some embodiments, the processor 62 may be further configured to determine the shooting element based on the user's first selection instruction, and obtain the shooting template.

In some embodiments, when adjusting each gimbal movement trajectory such that the duration of each gimbal movement trajectory matches the duration of each background music segment, the processor 62 may be configured to adjust the movement speed of the gimbal based on the duration information corresponding to the template segment, such that the duration of the completion of the gimbal movement trajectory may be consistent with the duration information corresponding to the template segment.

In some embodiments, when determining the shooting template for the video to be shot, the processor 62 may be configured to receive a third selection instruction sent by the user, the third selection instruction including an identification of a preset shooting template, the preset shooting template including preset background music, preset gimbal movement trajectory, and preset shooting elements; and determine the shooting template based on the third selection instruction.

In some embodiments, before determining the shooting template for the video to be shot, the processor 62 may be configured to receive a trial instruction from the user, and select a specified template segment based on the trial instruction; and send the gimbal movement trajectory corresponding to the template segment to the gimbal to control the gimbal movement based on the movement trajectory.

In some embodiments, before determining the shooting template for the video to be shot, the processor 62 may be configured to receive a trial instruction from the user, the trial instruction including background music and/or gimbal movement trajectory and/or identification of the shooting element, and display the shooting effect corresponding to the background music and/or the shooting element to the user based on the trial instruction such that the user can select the background music and/or the shooting element based on the shooting effect to determine the shooting template for the video to be shot.

In some embodiments, when sending the parameters corresponding to the gimbal trajectory in the shooting template to the gimbal to control the gimbal to drive the shooting device to shoot according to the gimbal trajectory, the processor 62 may be configured to send the parameters corresponding to the gimbal trajectory to the gimbal via a wireless connection or a wired connection.

Figure 7:
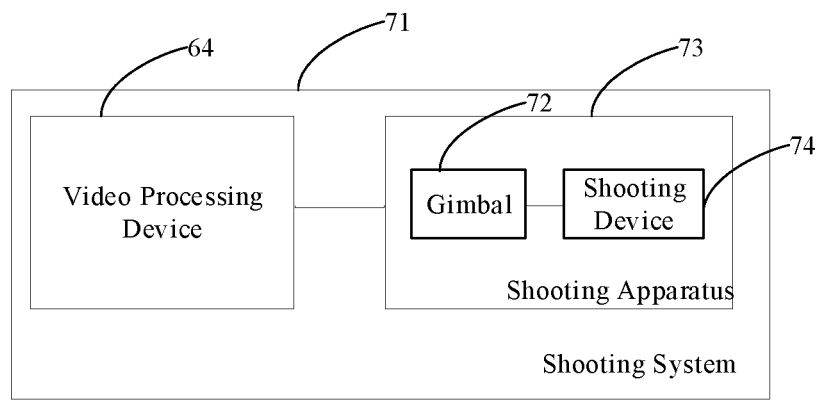
FIG. 7 is a schematic structural diagram a shooting system according to an embodiment of the present disclosure.

FIG. 7 is a schematic structural diagram a shooting system 71 according to an embodiment of the present disclosure. As shown in FIG. 7, the shooting system 71 includes the video processing device 64 described in any of the above embodiments and a shooting apparatus 73. The shooting apparatus 73 includes a gimbal 72 and a shooting device 74 driven by the gimbal 72. The video processing device 64 and the shooting apparatus 73 can be connected in a wireless or wired manner.

Figure 8:
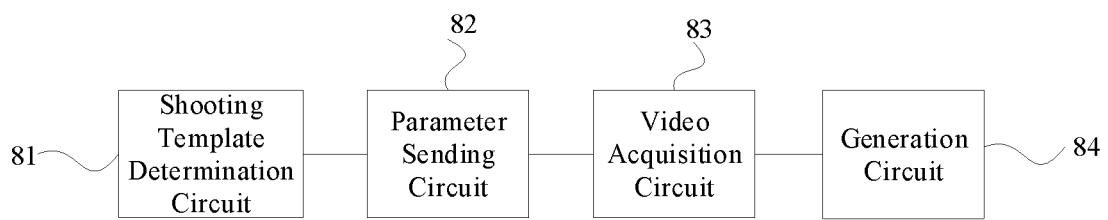
FIG. 8 is a schematic structural diagram of a video processing device according to another embodiment of the present disclosure.

FIG. 8 is a schematic structural diagram of a video processing device according to another embodiment of the present disclosure. As shown in FIG. 8, the video processing device includes a shooting template determination circuit 81 configured to determine a shooting template of a video to be shot, the shooting template including background music, a gimbal movement trajectory for at least one segment of the video to be shot, and a shooting element corresponding to at least one segment of the video to be shot; a parameter sending circuit 82 configured to send the parameters corresponding to the gimbal trajectory in the shooting template to the gimbal to control the gimbal to drive the shooting device to shoot according to the gimbal trajectory; a video acquisition circuit 83 configured to obtain information of at least one video segment; and a generation circuit 84 configured to generate a video file based on the information of the at least one video segment.

An embodiment of the present disclosure further provides a computer-readable storage medium. The computer-readable storage medium stores program instructions. When executed by a processor, the program instructions can cause the processor to implement the video processing method described above.

The technical solutions and technical features of the various embodiments mentioned above can be used alone or in combination without conflicting with the present disclosure. As long as they do not go beyond the scope of knowledge of those skilled in the art, there modifications should be considered as the equivalent embodiments within the scope of the present disclosure.

In the several embodiments provided in the present application, it should be understood that the disclosed apparatus and method may be implemented in other manners. For example, the described apparatus embodiment is merely exemplary. For example, the unit or module division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the functions may be stored in a computer-readable storage medium. Based on such an understanding, the technical solutions of the present disclosure essentially, or the part contributing to the prior art, or a part of the technical solutions may be implemented in a form of a software product. The computer software product is stored in a storage medium and includes several instructions for instructing a processor to perform all or a part of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The above description merely illustrates some embodiments of the disclosure and is not intended to limit the scope of the disclosure. Any equivalent changes in structures or processes made in light of the specification and the drawings, and their direct or indirect application in other related technical fields should all be encompassed in the scope of the present disclosure.

It should be noted that the foregoing embodiments are merely intended for describing the technical solutions of the present disclosure instead of limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A video processing method comprising:
   determining a shooting template, the shooting template including background music, one or more gimbal movement trajectories, and one or more shooting elements;
   sending one or more parameters corresponding to the one or more gimbal movement trajectories to a gimbal to control the gimbal to drive a shooting device to shoot according to the one or more gimbal movement trajectories;
   obtaining information of at least one video segment; and
   generating a video file based on the at least one video segment.

2. The method of claim 1, wherein determining the shooting template includes:
   receiving the background music input by a user;
   identifying one or more music nodes of the background music;
   segmenting the background music into one or more background music segments based on the one or more music nodes; and
   generating the shooting template that includes one or more template segments, a duration of each of the one or more template segments equaling a duration of one of the one or more background music segments.

3. The method of claim 2, further comprising, after segmenting the background music into the one or more background music segments:
   for one background music segment of the one or more background music segments, determining one gimbal movement trajectory of the one or more gimbal movement trajectories corresponding to one template segment that corresponds to the one background music segment.

4. The method of claim 3, wherein determining the one gimbal movement trajectory corresponding to the one template segment includes:
   determining the one gimbal movement trajectory corresponding to the one template segment based on the duration of the one template segment.

5. The method of claim 4, wherein determining the one gimbal movement trajectory corresponding to the one template segment based on the duration of the one template segment includes:
   obtaining one or more candidate gimbal movement trajectories each having a movement duration consistent with the duration of the one template segment;
   obtaining score information of the candidate gimbal movement trajectories; and
   determining one of the one or more candidate gimbal movement trajectories with a highest score as the one gimbal movement trajectory corresponding to the one template segment.

6. The method of claim 4, wherein determining the one gimbal movement trajectory corresponding to the one template segment based on the duration of the one template segment includes:
   obtaining one or more candidate gimbal movement trajectories each having a movement duration consistent with the duration of the one template segment;
   pushing the one or more candidate gimbal movement trajectories to the user;
   receiving a selection instruction from the user; and
   determining, based on the selection instruction, one of the one or more candidate gimbal movement trajectories as the one gimbal movement trajectory corresponding to the one template segment.

7. The method of claim 3, determining the one gimbal movement trajectory corresponding to the one template segment includes:
   determining one of the one or more gimbal movement trajectories that conforms to a rhythm style of the one background music segment as the one gimbal movement trajectory corresponding to the one template segment.

8. The method of claim 2, further comprising, after segmenting the background music:
   determining, based on a selection instruction, at least one of the one or more shooting elements that corresponds to one of the one or more template segments.

9. The method of claim 2, wherein segmenting the background music includes:

segmenting the background music into the one or more background music segments based on the one or more music nodes according to a preset segmentation algorithm.

10. The method of claim 1, wherein determining the shooting template includes:
receiving the one or more gimbal movement trajectories and the background music selected by a user to generate the shooting template.

11. The method of claim 10, further comprising:
determining the one or more shooting elements based on a selection instruction to obtain the shooting template.

12. The method of claim 10, further comprising:
segmenting the background music into one or more background music segments based on music node information of the background music; and
adjusting one gimbal movement trajectory of the one or more gimbal movement trajectories to have a duration that matches a duration of one background music segment of the one or more background music segments.

13. The method of claim 12, wherein adjusting the one gimbal movement trajectory includes:
adjusting a movement speed of the gimbal such that the duration of the one gimbal movement trajectory is consistent with the duration of the background music segment.

14. The method of claim 1, wherein determining the shooting template includes:
receiving a selection instruction, the selection instruction including an identification of a preset shooting template, the preset shooting template including preset background music, a preset gimbal movement trajectory, and a preset shooting element; and
determining the shooting template according to the selection instruction.

15. The method of claim 1, further comprising, before determining the shooting template:
receiving a trial instruction;
selecting a template segment according to the trial instruction; and
sending a gimbal movement trajectory corresponding to the template segment to the gimbal to control the gimbal to move according to the gimbal movement trajectory corresponding to the template segment.

16. The method of claim 1, further comprising, before determining the shooting template:
receiving a trial instruction, the trial instruction including at least one of an identification of a candidate background music, an identification of a candidate gimbal movement trajectory, or an identification of a candidate shooting element; and
displaying a shooting effect corresponding to at least one of the candidate background music or the candidate shooting element.

17. The method of claim 1, wherein sending the one or more parameters to the gimbal includes:
sending the one or more parameters to the gimbal via a wireless connection or a wired connection.

* * * * *